United States Patent
Cheng

(10) Patent No.: US 9,340,069 B1
(45) Date of Patent: May 17, 2016

(54) WHEEL DEVICE

(71) Applicant: Wen-Chin Cheng, Taipei (TW)

(72) Inventor: Wen-Chin Cheng, Taipei (TW)

( * ) Notice: Subject to any disclaimer, the term of this patent is extended or adjusted under 35 U.S.C. 154(b) by 0 days.

(21) Appl. No.: 14/591,011

(22) Filed: Jan. 7, 2015

(51) Int. Cl.
*A47B 91/00* (2006.01)
*B60B 33/00* (2006.01)

(52) U.S. Cl.
CPC ......... *B60B 33/0028* (2013.01); *B60B 33/0042* (2013.01); *B60B 33/0049* (2013.01)

(58) Field of Classification Search
CPC . Y10T 16/184; Y10T 16/1853; Y10T 16/195; Y10T 16/196; Y10T 16/199; Y10T 16/201; Y10T 16/211; Y10T 16/212; B60B 33/0028; B60B 33/0042; B60B 33/0047; B60B 33/0049; B60B 33/0054; B60B 33/021; B60B 33/045; B62B 2301/20; B62B 9/18
See application file for complete search history.

(56) References Cited

U.S. PATENT DOCUMENTS

| | | | | |
|---|---|---|---|---|
| 1,912,795 A * | 6/1933 | Rice | ..................... | B60B 33/0002 16/21 |
| 2,498,700 A * | 2/1950 | Stampe | ..................... | H04L 12/00 178/4 |
| 4,391,350 A * | 7/1983 | Moriya | ................. | F16D 66/024 116/208 |
| 4,544,425 A * | 10/1985 | Provolo | .............. | B60B 33/0028 156/73.1 |
| 5,014,392 A * | 5/1991 | Melara | ................ | B60B 33/0028 16/46 |
| 5,143,427 A * | 9/1992 | Dick | ....................... | B60B 37/04 301/111.01 |
| 5,358,314 A * | 10/1994 | Spadotto | ................. | B60B 37/06 301/111.01 |
| 5,406,675 A * | 4/1995 | White | ..................... | B60B 33/00 16/35 D |
| 5,537,715 A * | 7/1996 | Yang | ................... | B60B 33/0042 16/35 R |
| 6,938,964 B2 * | 9/2005 | Flood | ..................... | B65F 1/1473 301/111.07 |
| 2005/0108851 A1* | 5/2005 | Dayt | .................... | B60B 33/0021 16/31 R |
| 2014/0250628 A1* | 9/2014 | Tsai | ..................... | B60B 33/0007 16/47 |
| 2015/0047148 A1* | 2/2015 | Melara | ................ | B60B 33/0028 16/47 |

* cited by examiner

*Primary Examiner* — Chuck Mah
(74) *Attorney, Agent, or Firm* — Leong C. Lei

(57) ABSTRACT

The wheel device contains a base, an axle rotatably running through the base, two sleeves each having an axial through channel for the axle to run through; and two wheel members each having an axial first socket open to an inner side of the wheel member for joining with an end of the axle. The axle has a first neck section adjacent to each end of the axle with a small diameter than the axle's other sections. Along the axial through channel of each sleeve, there is a narrower first collar section. Inside the first socket of each wheel member, there is a narrower second collar section. After the axle runs through a sleeve and joins to a wheel member, the more extensive first and second collar sections are jointly embedded in the sleeve's more reduced first neck section, thereby enhancing the wheel device's operational life and reliability.

10 Claims, 6 Drawing Sheets

WHEEL DEVICE

BACKGROUND OF THE INVENTION (a) Technical Field of the Invention

The present invention is generally related to wheels, and more particular to wheels with enhanced reliability when rotating around their axles.

(b) Description of the Prior Art

For a conventional wheel device usually installed under a piece of furniture or luggage, the wheel device usually contains a base, an axle running through the base, and wheel members joined to the axle's two ends. To ensure that the wheel members do not fall off from the axle, as shown in FIGS. 1 and 2, the axle 51 has at least a ring notch 511 and, correspondingly, a wheel member 52 has a flange 521 to embed into the ring notch 511. As such, the wheel member 52 is positioned at a specific location and is prevented from sliding along the axle 51.

However, conventionally the wheel member 52 is made of a plastic material and is produced by injection molding. The flange 521 cannot be too high or too wide due to production limitation and, therefore, the flange 521 is usually smaller than 0.5 mm in height and 1 mm in width. During assembly, brute force is usually applied to drive the wheel member 51 onto the axle 51 and the flange 521 into the ring notch 511. The small flange 521 often gets damaged in the process and the interlocking between the damaged flange 521 and the ring notch 511 is easy to break off. The wheel member 52 as such can slide axially along the axle 51 or even fall off when the wheel device is operated.

SUMMARY OF THE INVENTION

To obviate the shortcomings of the prior art, a novel wheel device is provided herein. The wheel device contains a base, an axle rotatably running through the base, two sleeves each having an axial through channel for the axle to run through; and two wheel members each having an axial first socket open to an inner side of the wheel member for joining with an end of the axle. The axle has a first neck section adjacent to each end of the axle with a small diameter than the axle's other sections. Along the axial through channel of each sleeve, there is a narrower first collar section. Inside the first socket of each wheel member, there is a narrower second collar section.

A gist of the present invention lies in that, after the axle runs through a sleeve and joins to a wheel member, the more extensive first and second collar sections are jointly embedded in the sleeve's more reduced first neck section. The first and second collar sections jointly forms a "flange" of a length significantly larger than that of the prior art, thereby effectively limiting a wheel member's displacement along the axle. By this design, the manufacturing of the wheel device is not constrained by the dimension of the mold. In addition, each wheel member can more stably turn around the axle with enhanced operational life.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 2:
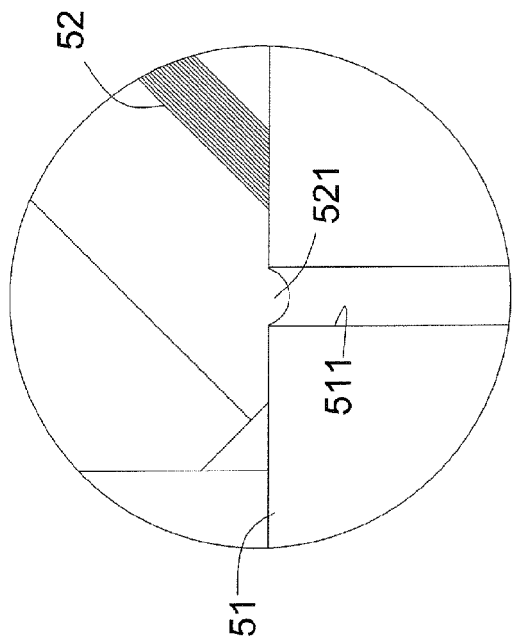
FIG. 2 is an enlarged diagram showing the details of a part of the wheel device marked as 2 in FIG. 1.
Figure 1:
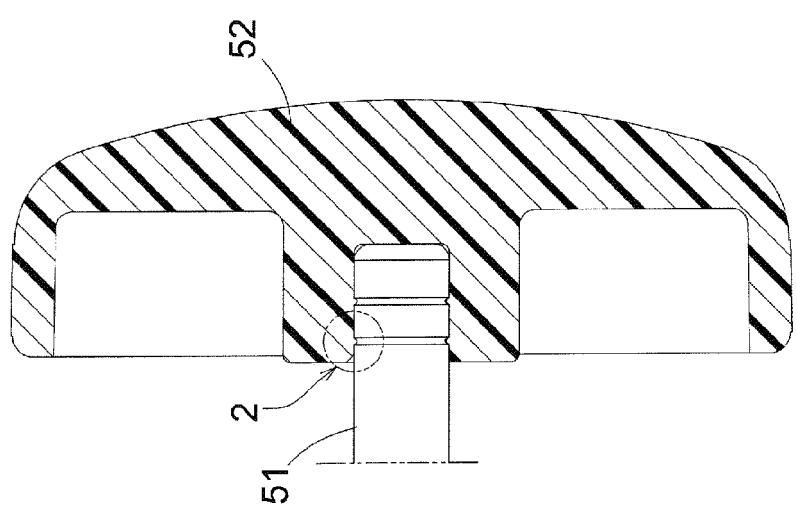
FIG. 1 is sectional schematic diagram showing a wheel member of a conventional wheel device.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As illustrated in FIGS. 3 to 7, a wheel device according to an embodiment of the present invention contains a base 10, an axle 20 rotatably running through the base 10, two sleeves 30 each having an axial through channel 31 for the axle 20 to run through, two wheel members 40 each having an axial first socket 41 open to an inner side for joining with an end of the axle 20. The axle 20 has a first neck section 21 adjacent to each end of the axle 20 with a small diameter than the axle 20's other sections. Each first neck section 21 has an inner segment 21a and an outer segment 21b. Along the axial through channel 31 of each sleeve 30, there is a narrower first collar section 311. After the axle 20 runs through a sleeve 30, the axial through channel 31's more extensive first collar section 311 interfaces with the sleeve 30's more reduced first neck section 21 adjacent to its inner segment 21a. Inside the first socket 41 of each wheel member 40, there is a narrower second collar section 411. After the axle 20 joins to a wheel member 50, the first socket 41's more extensive second collar section 411 interfaces with the sleeve 30's more reduced first neck section 21 adjacent to its outer segment 21b.

Figure 3:
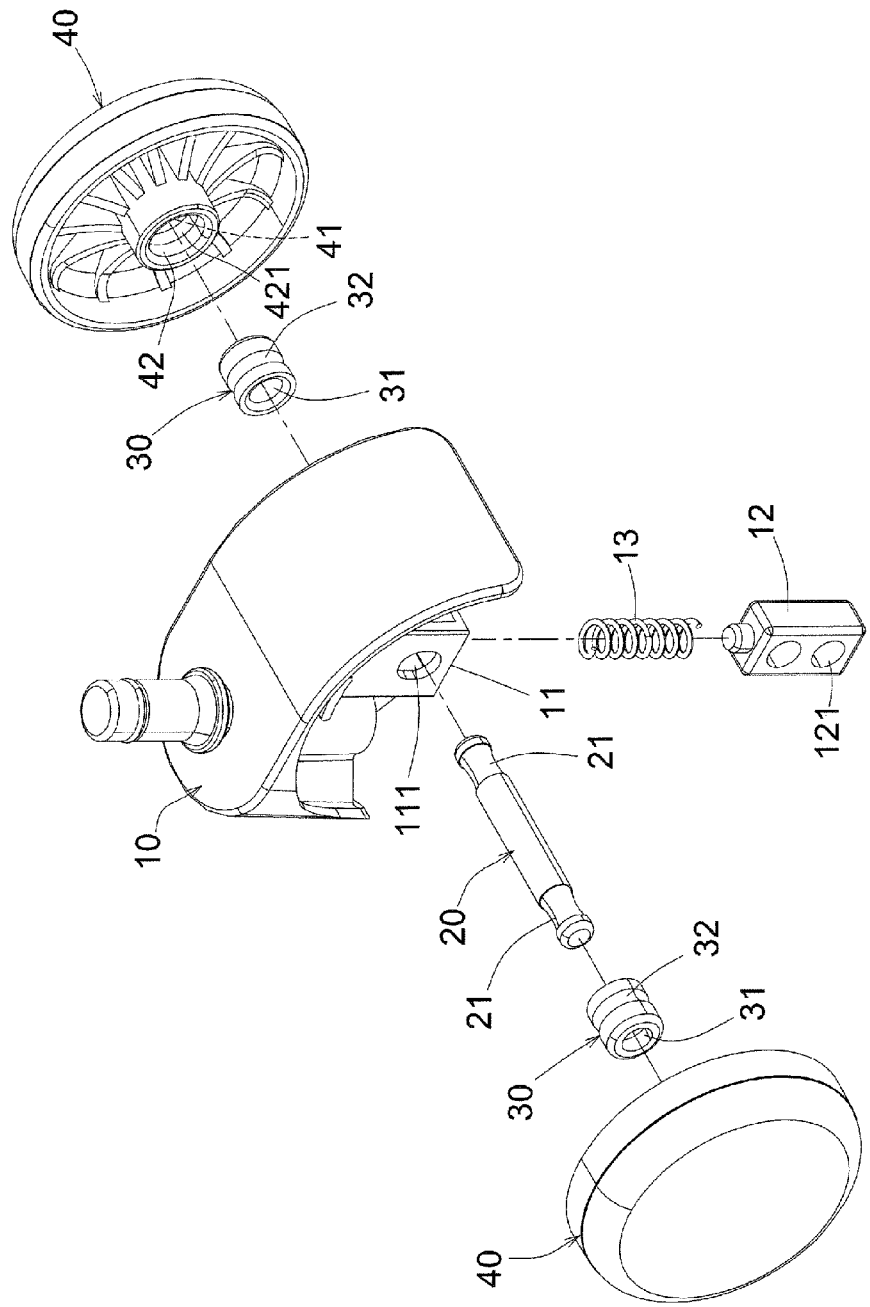
FIG. 3 is a perspective break-down diagram showing the various components of a wheel device according to an embodiment of the present invention.
Figure 4:
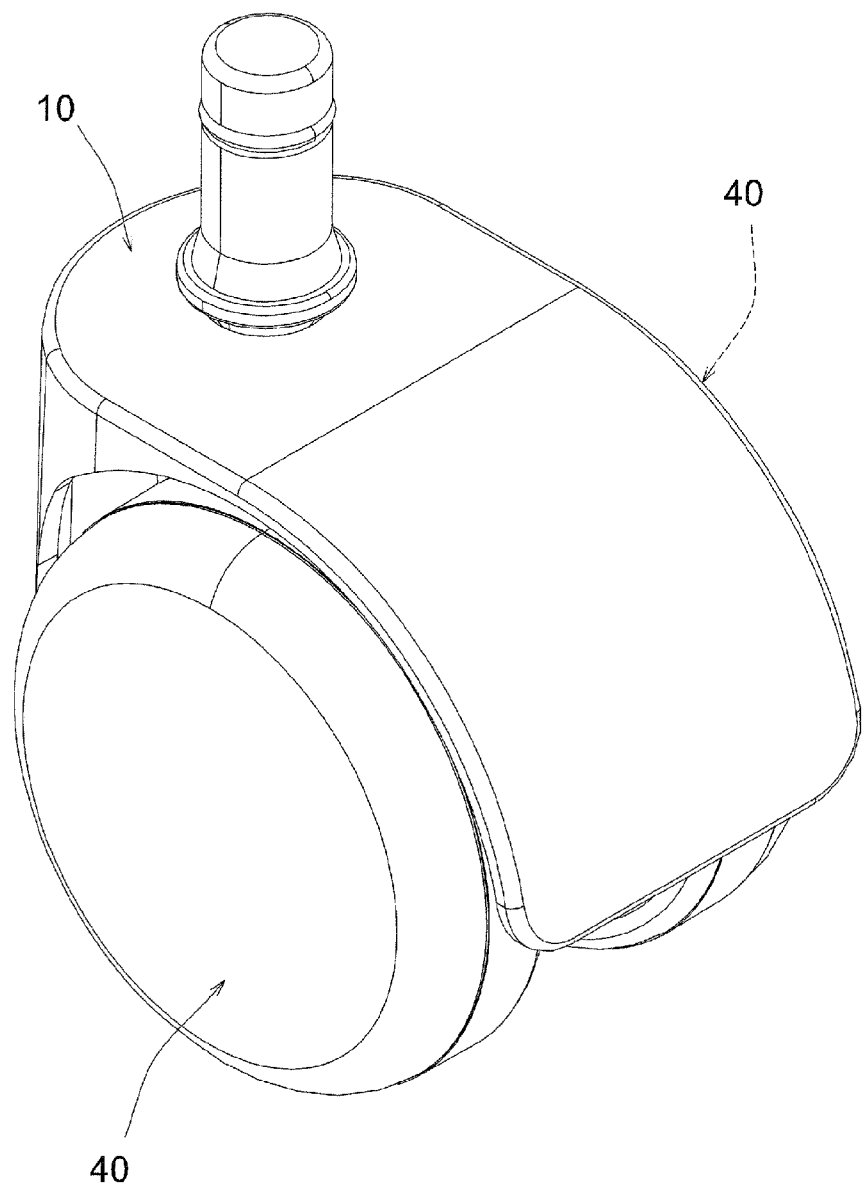
FIG. 4 is a perspective diagram showing the wheel device of FIG. 3 after its assembly.
Figure 5:
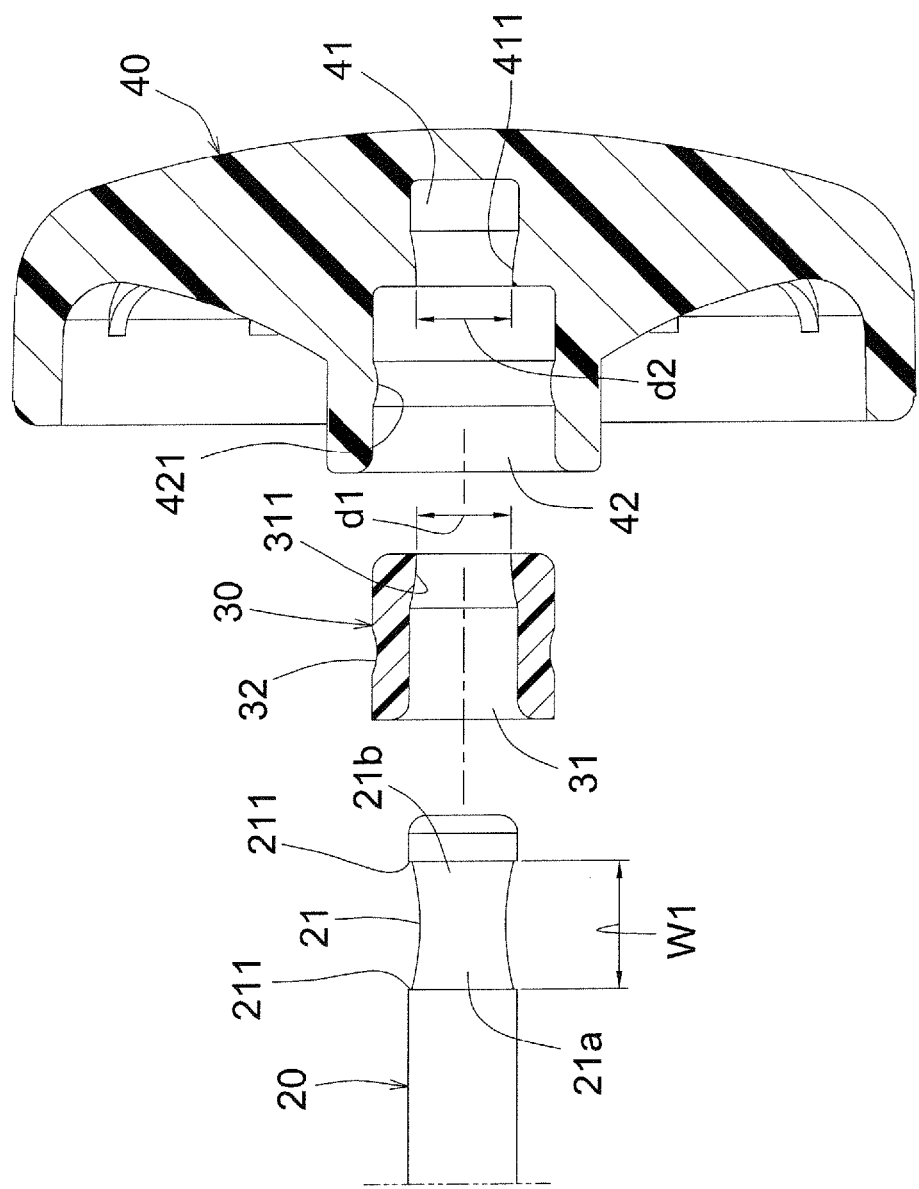
FIG. 5 is a sectional schematic diagram showing how an axle is joined to a wheel member of the wheel device of FIG. 3.
Figure 7:
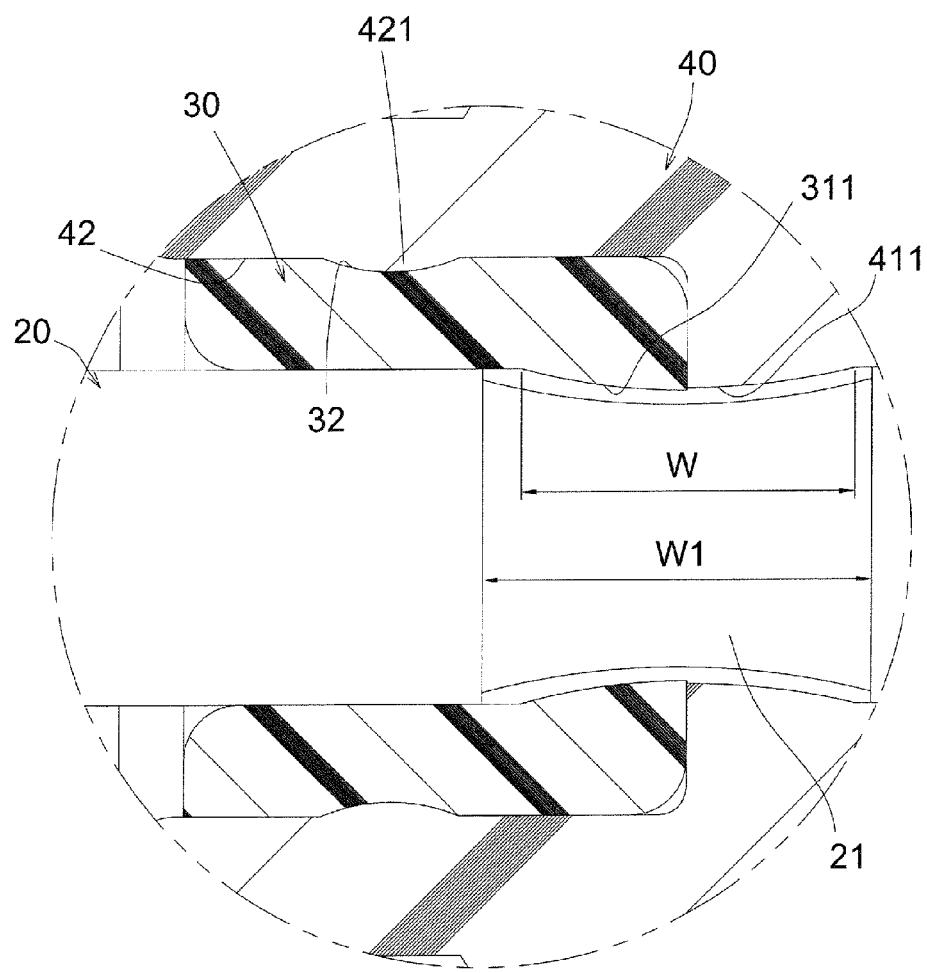
FIG. 7 is an enlarged diagram showing the details of a part of the wheel device marked as 7 in FIG. 6.

As shown in FIGS. 3, 5, and 7, each wheel member 40 has the second collar section 411 and the first collar section 311 jointly embedded into the first neck section 21 of the axle 20. In other words, the second collar section 411 and the first collar section 311 jointly forms a "flange" of a length W significantly larger than that of the prior art, effectively limiting a wheel member 40's displacement along the axle 20. By this design, the manufacturing of the wheel device is not constrained by the dimension of the mold. In addition, each wheel member 40 therefore can more stably turn around the axle 20 with enhanced operational life.

Furthermore, each wheel member 40 has an axial second socket 42 that is aligned with the first socket 41 and is positioned between the inner side of the wheel member 40 and the first socket 41. The second socket 42 is for receiving the sleeve 30.

Figure 6:
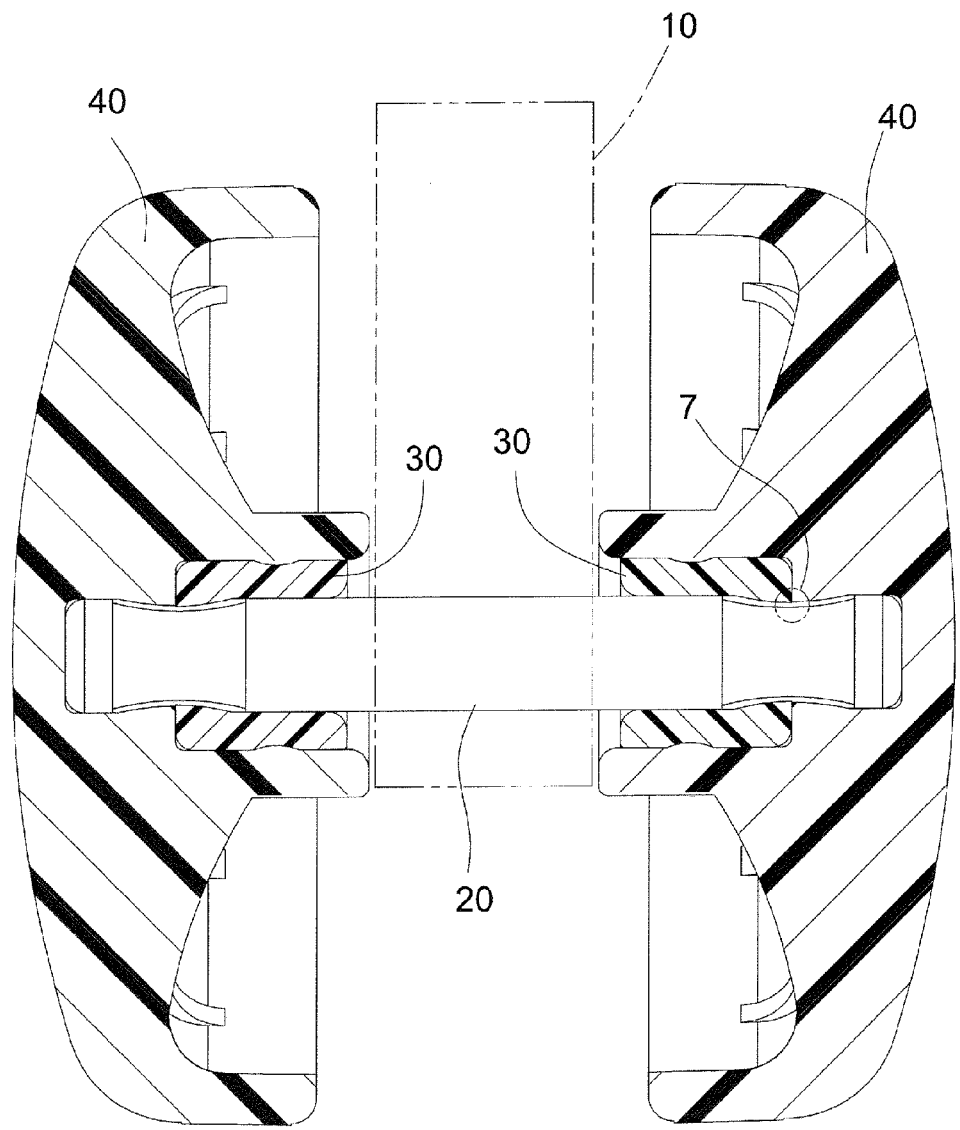
FIG. 6 is a sectional schematic diagram showing the wheel device of FIG. 3 after its assembly.

As shown in FIGS. 5 to 7, inside the second socket 42 of each wheel member 40, there is a narrower third collar section 421. Correspondingly, each sleeve 30 has a narrower second neck section 32. As the sleeve 30 is plugged into the second socket 42, the third collar section 421 is embedded into the second neck section 32, and the sleeve 30 is as such tightly joined with the wheel member 40 and rotates synchronously with the wheel member 40.

Please note that the first collar section 311 has a smaller inner diameter (d1) than that (d2) of the second collar section 411. Additionally, by having each sleeve 30 made of a better wear-resisting material than that of the wheel member 40, each sleeve 30 will sustain more frictional contact with the axle 20, thereby enhancing the operational life of the wheel device.

The sleeve 30 can be made of a metallic material or a plastic material. The present invention does not impose specific constraints.

Please also note that each first neck section 21 has a larger length (W1) than the distance (W) between the first and second collar sections 311 and 411. As such, the first and second collar sections 311 and 411 are entirely embedded in the first neck section 21. Additionally, the two ends of each first neck section 21 have abrupt edges 211, respectively, so as to reliably confine the first and second collar sections 311 and 411 within the first neck section 21. The wheel members 40 are as such not easy to break off from the axle 20. Each first neck section 21 can have a curved or rectangular circumference. The present invention does not impose specific constraints.

As shown in FIG. 3, the base 10 contains a hollow suspension member 11 and a block 12 housed inside the suspension member 11. Each of two opposing walls of the suspension member 11 has a through channel 111 and, correspondingly, the block 12 also has a through channel 121. The through channels 111 on the walls and the through channel 121 of the block 12 are aligned and threaded through by the axle 20. At least a spring 13 is housed in the suspension member 11 and is configured between a wall of the suspension member 11 and the block 12 so as to absorb shock delivered from the wheel members 40, to reduce noise, and to smooth the operation of the wheel device.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wheel device comprising:
a base;
an axle rotatably running through the base;
two sleeves, each having an axial through channel for the axle to run through; and
two wheel members, each having an axial first socket open to an inner side of the wheel member for joining with an end of the axle;
wherein the axle has a first neck section adjacent to each end of the axle with a diameter that is smaller than that of the axle's remaining section;
along the axial through channel of each sleeve, there is a narrower first collar section;
inside the first socket of each wheel member, there is a narrower second collar section;
wherein, after assembly, each end of the axle runs through a sleeve and joins to a wheel member, and the narrower first collar section of said sleeve and the narrower second collar section of said first socket are embedded in the first neck section of the axle to limit the wheel's displacement along said axle.

2. The wheel device according to claim 1, wherein each wheel member further has an axial second socket that is aligned with the first socket and is positioned between the inner side of the wheel member and the first socket for receiving a sleeve.

3. The wheel device according to claim 2, wherein, inside the second socket of each wheel member, there is a narrower third collar section; correspondingly, each sleeve has a narrower second neck section; and, as the sleeve is plugged into the second socket, the third collar section is embedded into the second neck section.

4. The wheel device according to claim 1, wherein the first collar section has a smaller inner diameter than that of the second collar section.

5. The wheel device according to claim 1, wherein two ends of each first neck section have abrupt edges, respectively.

6. The wheel device according to claim 1, wherein each first neck section has a curved circumference.

7. The wheel device according to claim 1, wherein the sleeve is made of a metallic material.

8. The wheel device according to claim 1, wherein the sleeve is made of a plastic material.

9. The wheel device according to claim 1, wherein each first neck section has a larger length than the total length of the first and second collar sections.

10. The wheel device according to claim 1, wherein the base comprises a hollow suspension member, a block housed inside the suspension member, and a spring; each of two opposing walls of the suspension member has a through channel and the block also has a through channel; the through channels are aligned and threaded through by the axle; the spring is housed in the suspension member and is configured between a wall of the suspension member and the block so as to absorb shock delivered from the wheel members.

* * * * *